(12) United States Patent
Wang et al.

(10) Patent No.: US 12,302,239 B2
(45) Date of Patent: May 13, 2025

(54) METHODS AND APPARATUS FOR STEERING A WIRELESS/TRANSMIT RECEIVE UNIT BETWEEN MULTIPLE WIRELESS NETWORKS

(71) Applicant: InterDigital Patent Holdings, Inc., Wilmington, DE (US)

(72) Inventors: Guanzhou Wang, Brossard (CA); Tezcan Cogalan, London (GB); Alain Mourad, Ascot (GB); Atle Monrad, Froland (NO); Saad Ahmad, Montreal (CA); Ulises Olvera-Hernandez, Saint-Lazare (CA); Anuj Sethi, Ottawa (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 18/782,780

(22) Filed: Jul. 24, 2024

(65) Prior Publication Data
US 2024/0381239 A1 Nov. 14, 2024

Related U.S. Application Data

(63) Continuation of application No. 18/288,088, filed as application No. PCT/US2022/026026 on Apr. 22, 2022.
(Continued)

(51) Int. Cl.
*H04W 48/18* (2009.01)
*H04W 48/16* (2009.01)
(52) U.S. Cl.
CPC .......... *H04W 48/18* (2013.01); *H04W 48/16* (2013.01)

(58) Field of Classification Search
CPC ..... H04W 48/18; H04W 48/16; H04W 60/00; H04W 8/205
See application file for complete search history.

(56) References Cited

U.S. PATENT DOCUMENTS

| 12,256,322 B2 | 3/2025 | Jeong et al. |
| 2020/0236527 A1 | 7/2020 | Sood et al. |

(Continued)

FOREIGN PATENT DOCUMENTS

| EP | 2088723 A1 * | 8/2009 | .......... H04W 12/062 |
| EP | 3846545 A1 * | 7/2021 | ............ H04W 48/16 |

(Continued)

OTHER PUBLICATIONS

3rd Generation Partnership Project (3GPP), R2-1909305, "Overview of Non-Public Networks", Nokia, 3GPP TSG RAN WG2 Meeting #107 Prague, Czech Republic, Aug. 26-30, 2019, 5 pages.
(Continued)

*Primary Examiner* — Julio R Perez
(74) *Attorney, Agent, or Firm* — Condo Roccia Koptiw LLP

(57) ABSTRACT

A method implemented in a Wireless Transmit/Receive Unit, WTRU, for selecting a local network for the WTRU to join includes storing steering of roaming, SoR, information for a plurality of local service hosting networks, wherein the SoR information includes an indication of a priority order in a list of network identifiers, switching to an access mode for network searching, searching for a local service hosting network to join from among the plurality of local service hosting networks, and selecting a local service hosting network to join based on the indication of the priority order in the list of network identifiers. The method may further include updating the SoR information during any one or more of a periodic procedure or a mobility registration procedure.

20 Claims, 14 Drawing Sheets

Related U.S. Application Data

(60) Provisional application No. 63/275,004, filed on Nov. 3, 2021, provisional application No. 63/181,016, filed on Apr. 28, 2021.

(56) References Cited

U.S. PATENT DOCUMENTS

| | | | | |
|---|---|---|---|---|
| 2022/0312306 | A1* | 9/2022 | Matolia | H04W 48/18 |
| 2022/0312360 | A1* | 9/2022 | Kuppelur | H04W 60/04 |
| 2023/0319700 | A1* | 10/2023 | Prabhakar | H04W 8/12 |
| | | | | 455/432.1 |
| 2024/0205811 | A1* | 6/2024 | Wang | H04W 48/16 |
| 2024/0297687 | A1 | 9/2024 | Raghavan et al. | |

FOREIGN PATENT DOCUMENTS

| | | | | |
|---|---|---|---|---|
| WO | 2018197790 A1 | | 11/2018 | |
| WO | WO-2019017689 A1 | * | 1/2019 | H04L 9/3242 |
| WO | WO-2021217163 A1 | * | 10/2021 | H04W 48/18 |
| WO | WO-2024172564 A1 | * | 8/2024 | |

OTHER PUBLICATIONS

3rd Generation Partnership Project (3GPP), SP-200799, "New SID: Study on 5G Networks Providing Access to Localized Services (FS_PALS)", 3GPP TSG SA Meeting #89e, Electronic Meeting, Sep. 15-21, 2020, 3 pages.

3GPP TR 22.844 V0.2.0, "3rd Generation Partnership Project; Technical Specification Group Services and System Aspects; Study on 5G Networks Providing Access to Localized Services; Stage 1, Release 18", Mar. 2021, 33 pages.

3GPP TS 23.122 V16.8.0, "3rd Generation Partnership Project; Technical Specification Group Core Network and Terminals; Non-Access-Stratum (NAS) functions related to Mobile Station (MS) in idle mode (Release 16)", Dec. 2020, 83 pages.

3GPP TS 23.501 V16.7.0, "Generation Partnership Project; Technical Specification Group Services and System Aspects; System Architecture for the 5G System (5GS); Stage 2 (Release 16)", Dec. 2020, 450 pages.

3GPP TS 23.502 V16.7.1, "Generation Partnership Project; Technical Specification Group Services and System Aspects; Procedures for the 5G System (5GS); Stage 2 (Release 16)", Jan. 2021, 244 pages.

3rd Generation Partnership Project (3GPP), S1-210194, "Update to FS_PALS use case: Automatic discovery and selection of 3rd party provider services over Hosting network access", Qualcomm, 3GPP TSG-SA WG1 #93 e-Meeting, Feb. 22-Mar. 4, 2021, 2pp.

3GPP TS 22.011 V16.5.0, Generation Partnership Project; Technical Specification Group Services and System Aspects; "3 Generation Partnership Project; Technical Specification Group Services and System Aspects; Service accessibility (Release 16)", Sep. 2020, pp. 34.

3GPP TR 23.700-07 V1.2.0, "3rd Generation Partnership Project; Technical Specification Group Services and System Aspects; Study on enhanced support of non-public networks (Release 17)", Nov. 2020, 247 pages.

3rd Generation Partnership Project (3GPP), R3-210637, "SNPN and Service Provider (SP) separation", 3GPP TSG-RAN WG3 #111-e, Jan. 25, 2021-Feb. 5, 2021, 8 pages.

\* cited by examiner

METHODS AND APPARATUS FOR STEERING A WIRELESS/TRANSMIT RECEIVE UNIT BETWEEN MULTIPLE WIRELESS NETWORKS

CROSS REFERENCE TO RELATED APPLICATIONS

This application is a continuation of U.S. patent application Ser. No. 18/288,088, which is the National Stage Entry under 35 U.S.C. § 371 of Patent Cooperation Treaty Application No. PCT/US2022/026026, filed Apr. 22, 2022, which claims the benefit of U.S. Provisional Patent Application Ser. No. 63/181,016 filed 28 Apr. 2021 and U.S. Provisional Patent Application Ser. No. 63/275,004 filed 3 Nov. 2021, the disclosures of all of which are incorporated by reference herein in their entireties.

FIELD

This disclosure pertains to methods and apparatus for steering Wireless Transmit/Receive Units (WTRUs) between multiple wireless networks.

BACKGROUND

In some circumstances, a small cellular network may be deployed to provide services to local users within a certain area. For example, a temporary non-public cellular network may be set up to provide streaming video service to an audience at a live concert or football match. For another example, in locations such as airports, shopping malls, or school campuses, where large crowds may gather, small cellular networks may be deployed to provide localized services, such as commercial ads in a shopping mall. The services provided by these small cellular networks typically have two common characteristics, namely, (1) the services are localized, meaning that they are related to the activities/events in a certain localized area, and are usually limited to the users within the area and (2) the users do not utilize these services on a regular basis, but, most likely, in an on-demand or temporary fashion.

3GPP is studying how to enhance the 5G system to provide such localized services and enable users to access the hosting network that provide those services under the Study Item FS_PALS (3GPP Work Item Description, SP-200799, "Study on 5G Networks Providing Access to Localized Services"). In this document, those localized services are referred to as "PALS (Providing Access to Localized Services) service", and a network that provides PALS services is referred to as a "PALS network", a "PALS hosting network", or simply a "hosting network".

A PALS hosting network may be a Non-Public Network as defined in 3GPP TS 23.501, "System Architecture for the 5G System", V16.7.0, 2020-12, but PALS service users may not have subscriptions to the PALS network. The PALS service provider may be the PALS network operator itself, another mobile network operator, or a third party service provider.

Steering of Roaming (SoR) function is used by home Public Land Mobile Network (HPLMN) operators to steer their roaming users toward preferred networks by updating the preferred PLMN list stored in the user's SIM (subscriber Identification Module) or UICC (Universal Integrated Circuit Card). In 5GS, the Control Plane SoR solution (CP-SoR) is used to allow the HPLMN to securely update the "Operator Controlled PLMN Selector with Access Technology" list in the WTRU.

Figure C.2.1 in Annex C of 3GPP TS 23.122 "Non-Access-Stratum (NAS) functions related to Mobile Station (MS) in idle mode", V16.8.0, 2020-12 shows the flows of CP-SoR during the Registration procedure, and Figure C.3.1 in Annex C of TS 23.122 shows the flows of CP-SoR after the Registration procedure.

BRIEF DESCRIPTION OF THE DRAWINGS

A more detailed understanding may be had from the detailed description below, given by way of example in conjunction with the drawings appended hereto. Figures in such drawings, like the detailed description, are exemplary. As such, the Figures and the detailed description are not to be considered limiting, and other equally effective examples are possible and likely. Furthermore, like reference numerals ("ref") in the Figures ("FIGs.") indicate like elements, and wherein.

DETAILED DESCRIPTION

Introduction

In the following detailed description, numerous specific details are set forth to provide a thorough understanding of embodiments and/or examples disclosed herein. However, it will be understood that such embodiments and examples may be practiced without some or all of the specific details set forth herein. In other instances, well-known methods, procedures, components, and circuits have not been described in detail, so as not to obscure the following description. Further, embodiments and examples not specifically described herein may be practiced in lieu of, or in combination with, the embodiments and other examples described, disclosed, or otherwise provided explicitly, implicitly and/or inherently (collectively "provided") herein.

Example Communications System

Figure 1A:
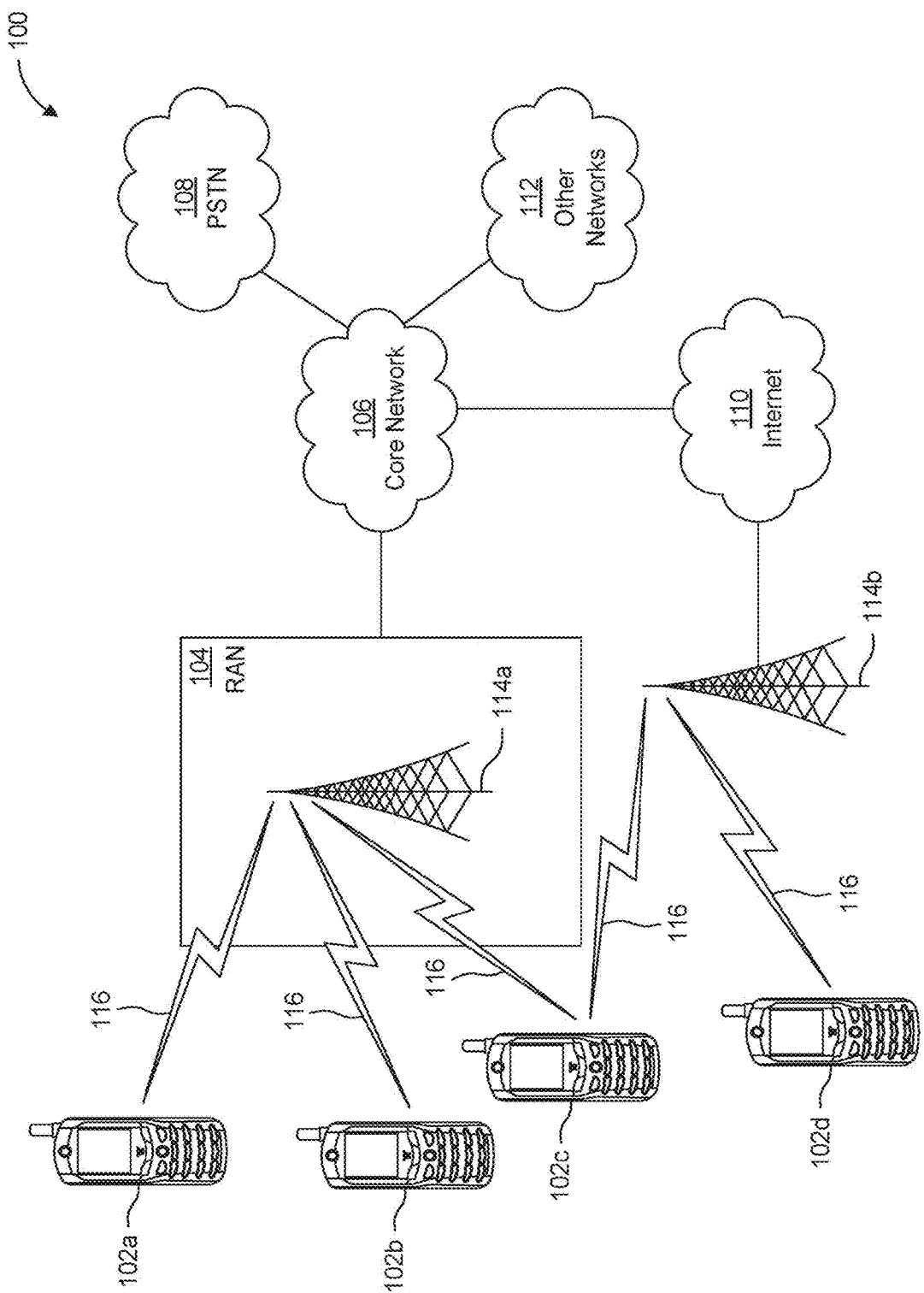
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a. 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
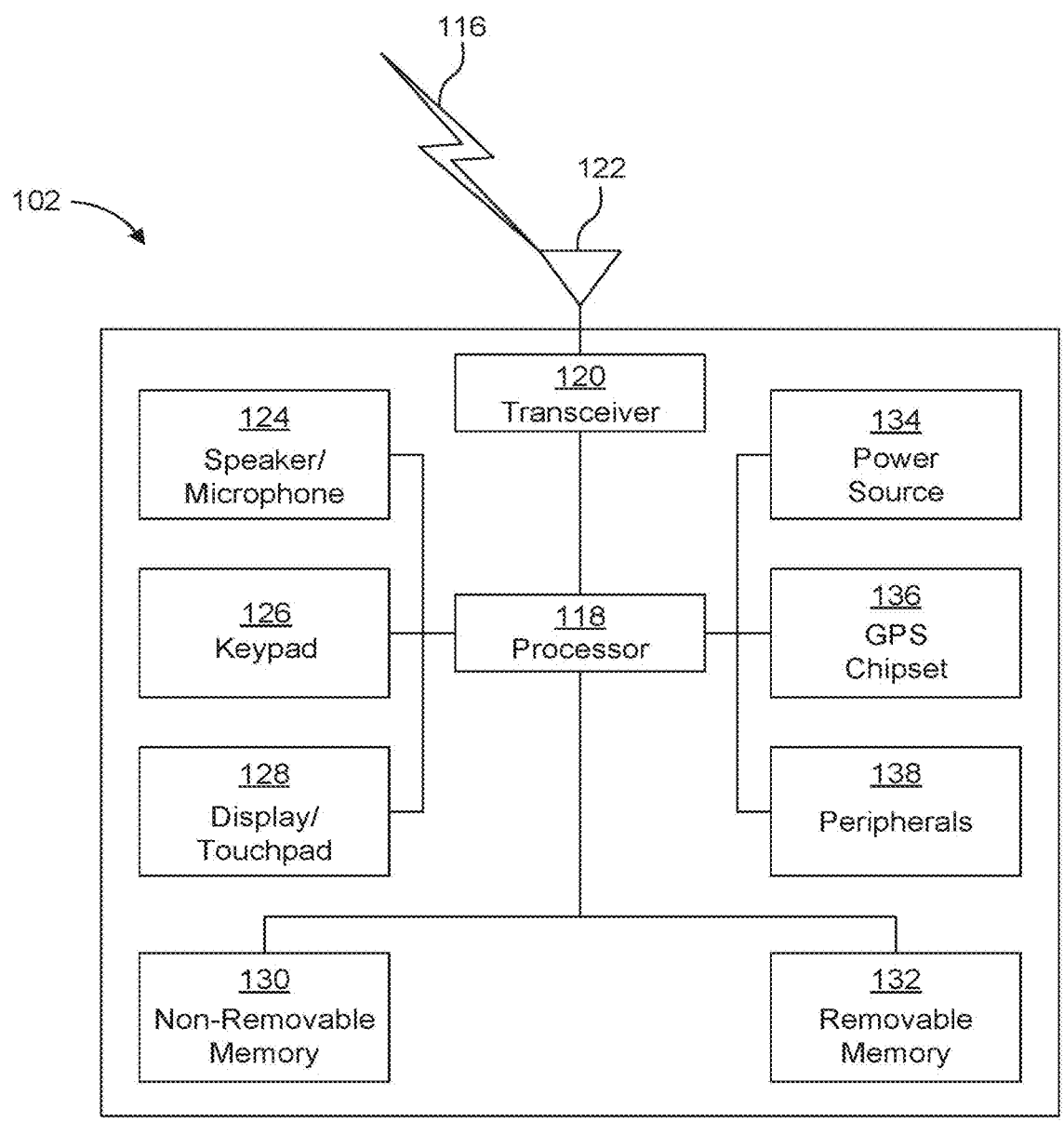
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the uplink (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the uplink (e.g., for transmission) or the downlink (e.g., for reception)).

Figure 1C:
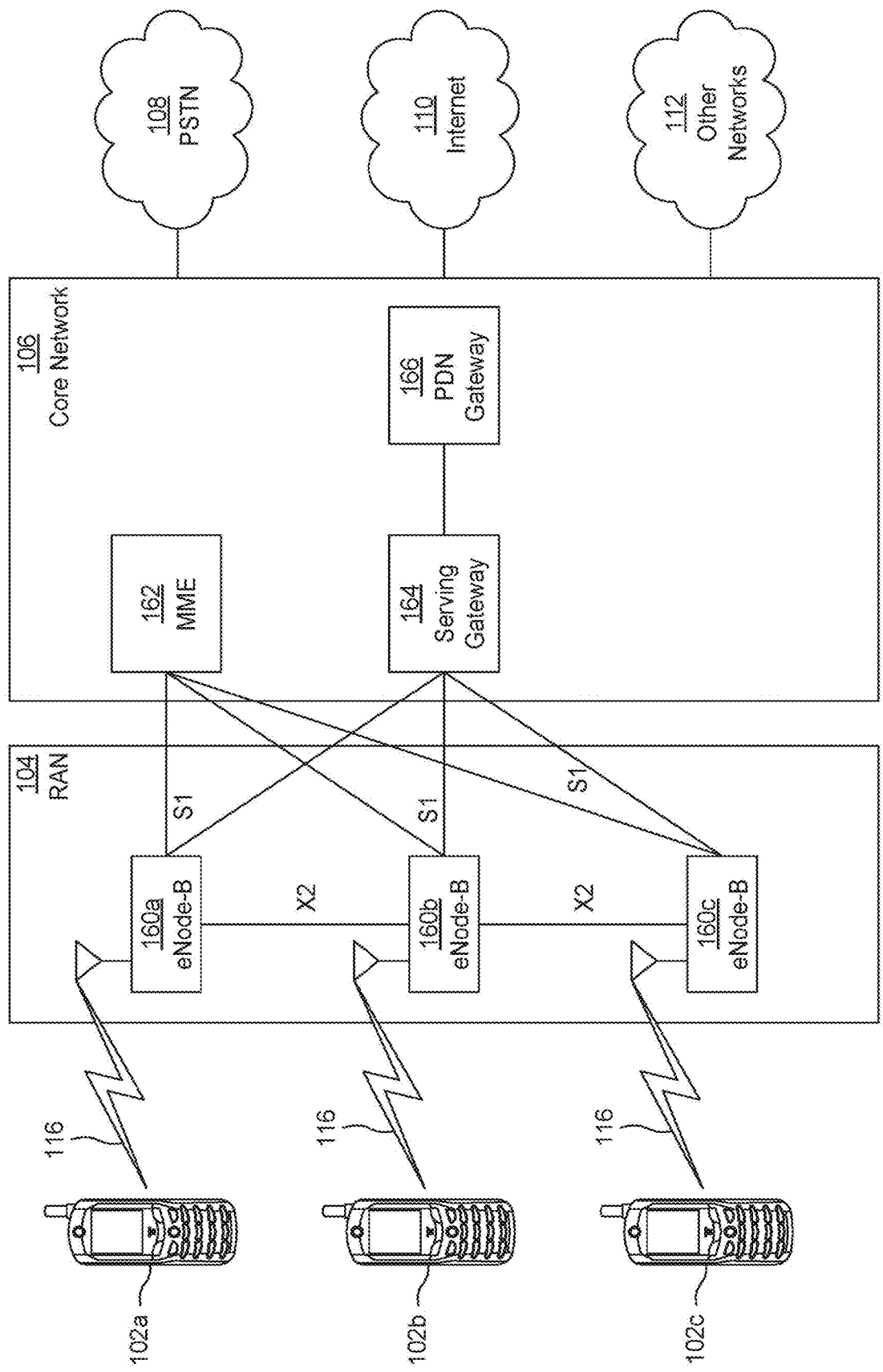
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink (UL) and/or downlink (DL), and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-ID as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11 ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11 ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
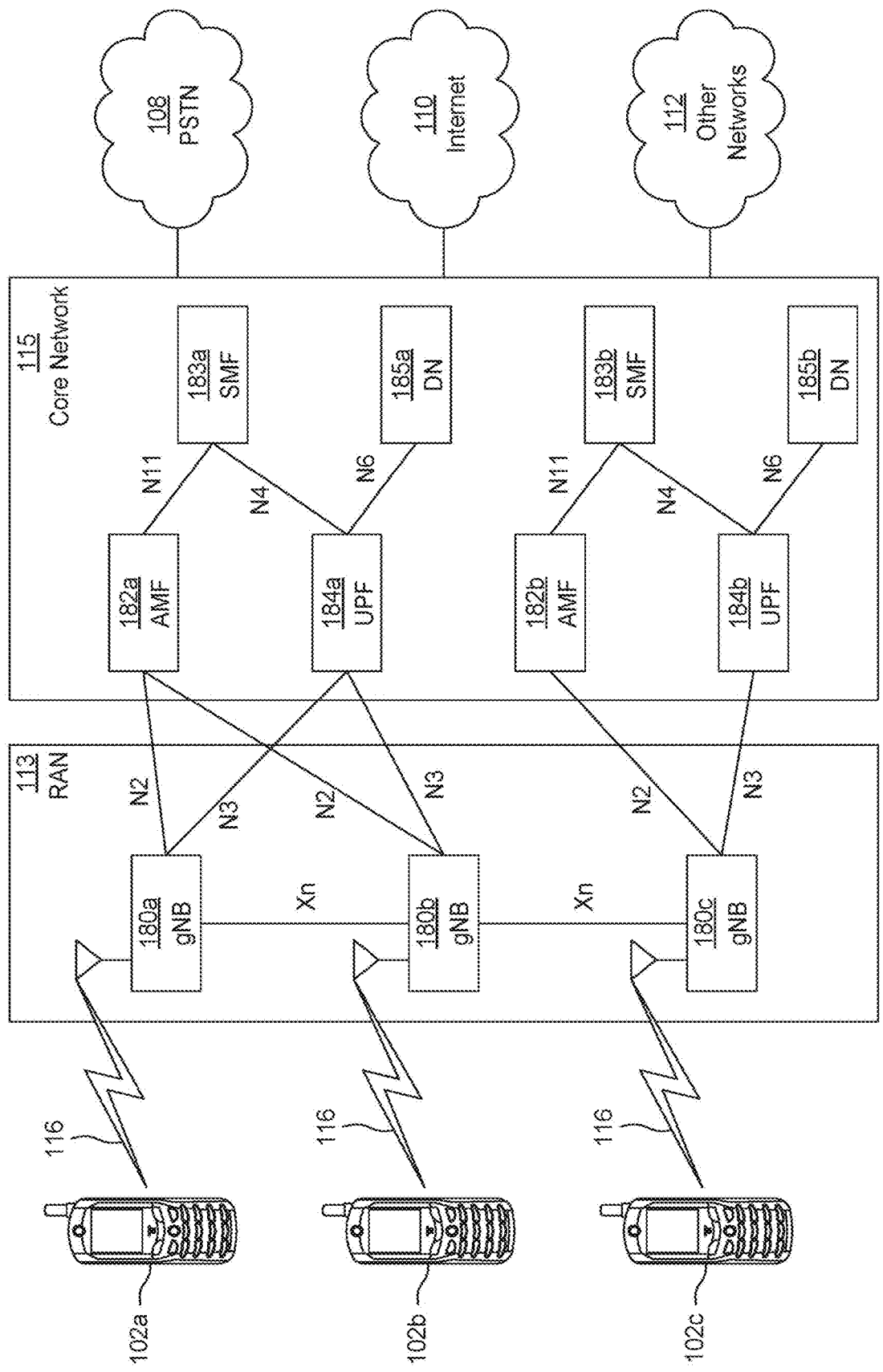
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 180b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF a82a, 182b may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Examples provided herein do not limit applicability of the subject matter to other wireless technologies, e.g., using the same or different principles as may be applicable.

As explained herein, a wireless transmit/receive unit (WTRU) may be an example of a user equipment (UE). Hence the terms UE and WTRU may be used with equal scope herein.

Network Steering Between Multiple Wireless Networks
Network Steering Between PLMN and PALS Network Potential PALS service users usually are PLMN subscribers who will camp on a PLMN network (either a Home PLMN or a Serving PLMN) most of the time. When the PALS service is available to the user, e.g. when the user is in the coverage area of a PALS network, the user needs to be steered toward the PALS network to register with and connect to the PALS network. Although it is possible for a user to manually select a PALS network, this method requires the user to possess the network selection information (e.g., name of the PALS network) and manually search for available PALS network. The inconveniences of this method likely will deter most users from using PALS services.

Thus, issues that are ripe for addressing include how to automatically steer WTRUs from a PLMN network to a PALS network when PALS service is available and how to automatically steer WTRUs from the PALS network back to the PLMN network when the PALS service becomes unavailable?

This section addresses techniques for steering WTRU's between a PLMN and a PALS network using special Steering of Roaming information for PALS network steering. In embodiments, an HPLMN-provided PALS Network Selector or a network identifier in the selector may be associated with a time window and an area. A network selector may be considered a data structure for a set of information used for network selection. The data structure may include the list of network identifiers, associated time window, associated geographic area, and the like. Hence, the network selector may be caused to be active only when certain time and/or location conditions are met or the network identifier may be considered for network selection only when the time and/or location conditions are met.

Figure 2:
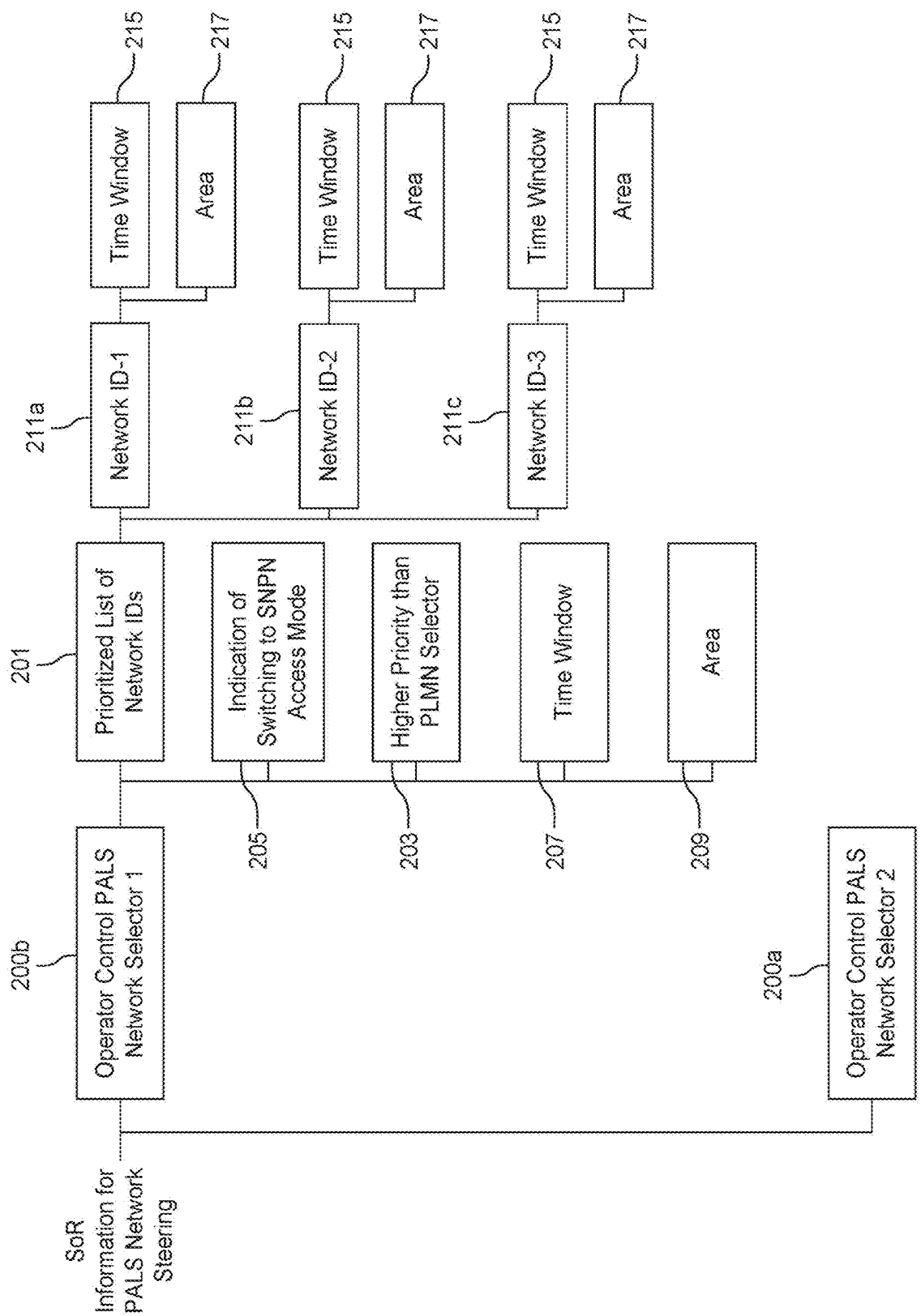
FIG. 2 is a diagram illustrating an exemplary manner in which data for use in an Operator-Controlled PALS Network Selector may be organized in accordance with an embodiment.

More particularly, based on the service agreement between the PLMN operator and the PALS service provider or PALS network operator, the WTRU's Home PLMN may create special SoR information for the purpose of automatically steering the WTRU between the PLMN and PALS networks. Referring now to FIG. 2, in addition to the normal operator-controlled PLMN selector 200a, the special SoR may contain one or more Operator-Controlled PALS Network Selector(s) 200b that may comprise any one or more of the following data (with FIG. 2 illustrating an exemplary manner in which such information may be organized):

(i) A prioritized list of PALS network identifiers (201). The PALS network identifiers may be in the form of a normal PLMN identifier or a SNPN network identifier.

(ii) An indication of whether the PALS Network Selector has higher priority than other PLMN selectors (e.g., Operator-Controlled or User-Controlled PLMN selectors) (203).

(iii) An indication of whether the WTRU needs to switch to SNPN Access mode in order to use the PALS Network Selector (205).

(iv) A time window (207), e.g., the PALS Network Selector will only be used or activated during the time window.

(v) An area (209), e.g., the PALS Network Selector will only be used or activated when the WTRU is within a certain area. The area may be defined using 3GPP-defined area identifiers, such as Tracking Area Identity or geographic coordinates.

(vi) Each PALS network identifier, e.g., identifiers 211a, 211b, 211c, in the prioritized list may be associated with a specific time window (215), e.g., the network identifier will only be considered for network selection during the corresponding time window.

(vii) Each PALS network identifier, e.g., identifiers 211a, 211b, 211c, in the prioritized list may be associated with an area (217), e.g., the network identifier will only be considered for network selection if the WTRU is within the area. The area may be defined using 3GPP-defined area identifiers such as Tracking Area Identity or geographic coordinates.

(viii) Each PALS network identifier in the prioritized list may be associated with a Network Slice (not shown). The network identifier will only be considered for network selection if the Network Slice is in the WTRU's Configured NSSAI (Network Slice Selection Assistance Information) or Allowed NSSAI for the corresponding PLMN (ix) Each PALS network identifier in the prioritized list may be associated with one or more CAG (Closed Access Group) IDs (not shown). The WTRU would consider the PALS network if the PALS cell is broadcasting the CAG ID stored/configured in the WTRU associated with the corresponding PALS network.

Figure 3:
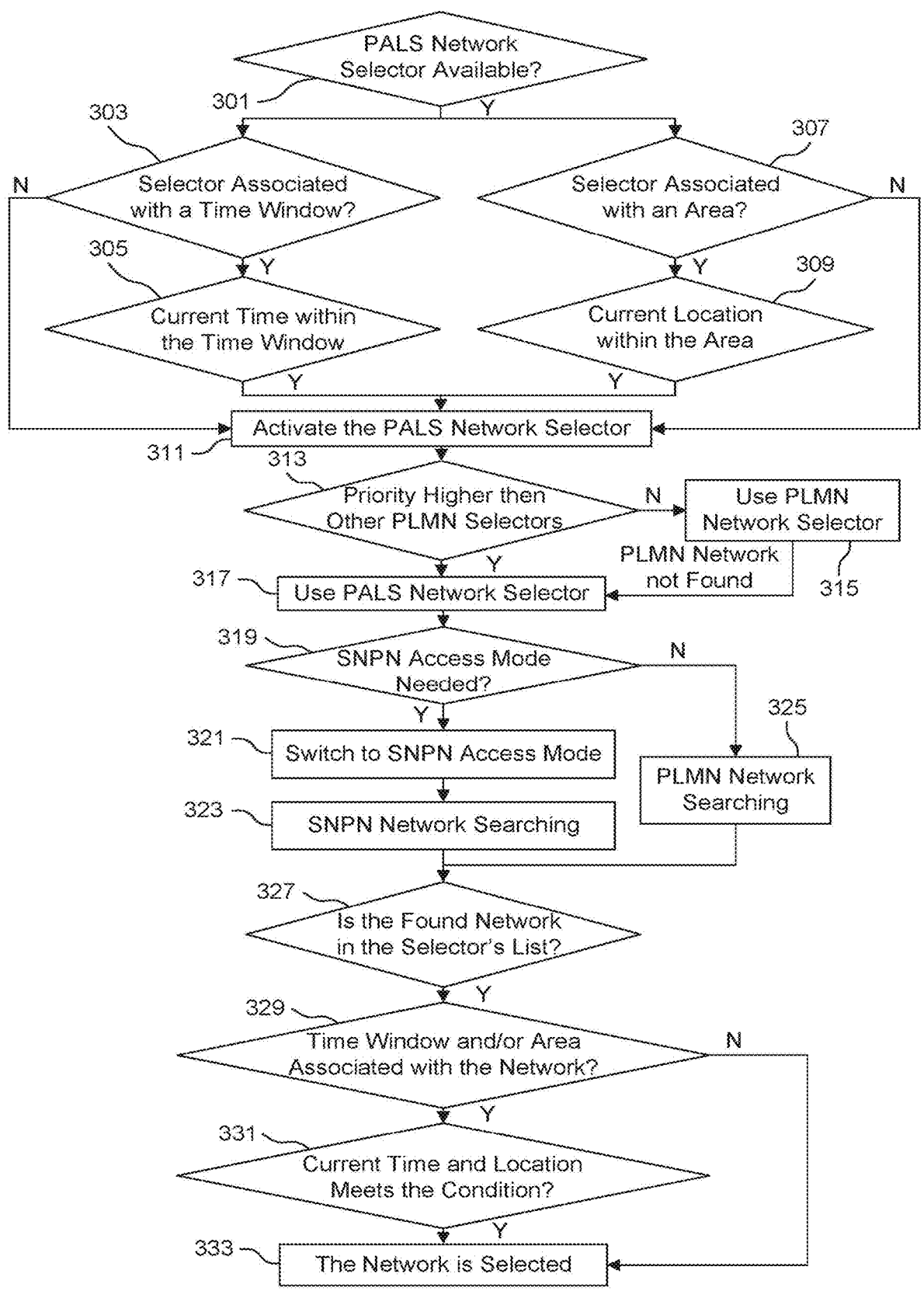
FIG. 3 is a flowchart illustrating a method for steering a WTRU between a PLMN and an appropriate PALS network in accordance with an embodiment.

The Home PLMN may store the above SoR information in the Unified Data Management (UDM)/Unified Data Repository (UDR) and send it to the WTRU using the SoR procedure defined in 3GPP TS 23.122, "Non-Access-Stratum (NAS) functions related to Mobile Station (MS) in idle mode", V16.8.0, 2020-12. If the WTRU has valid SoR information for PALS network steering, in an exemplary embodiment, it may perform a network selection operation such as described below and illustrated by the flowchart of FIG. 3.

First, the WTRU determines if it has a PALS Network Selector available (301). If not, the process ends. (Note that, in FIG. 3, decision step outcomes that result in the ending of the process, such as the aforementioned NO decision in step 301, are implicit—i.e., not shown in the flowchart—in order to avoid overly complicating the FIG.)

If, on the other hand, the WTRU determines in step 301 that a PALS Network Selector is available, flow continues in the flowchart. Next, the WTRU may determine whether to activate the PALS Network Selector based on the following:

(i) If the PALS Network Selector has an associated Time Window (decision step 303) and the current time is within the time window (decision step 305), the WTRU may activate the selector (311).

(ii) If the PALS Network Selector has an associated area (decision step 307) and the WTRU's current location is within the area (decision step 309), the WTRU may activate the selector (311).

(iii) If the PALS Network Selector has both an associated Time Window and an associated Area, the WTRU may activate the selector (311) only when both the current time and the WTRU's location meet the respective conditions.

If the PALS Network Selector is activated in 311, the WTRU may determine its priority against other PLMN selectors (313). For instance, if the PALS Network Selector is associated with an indication that it has higher priority than other PLMN selectors, it may use this Selector for network selection (317). If, on the other hand, if the PALS Network Selector is not associated with an indication that it has higher priority than other PLMN selectors, it may use other PLMN selectors for network selection (315); and, if no PLMN is available or selected, it may use the PALS Network Selector for network selection.

If the WTRU has determined to use the PALS Network Selector for network selection, it may check whether it needs to switch to SNPN Access Mode for network selection (319). If the PALS Network Selector has the indication that the WTRU should switch to SNPN access mode, it may switch to SNPN access mode (321). If the PALS Network Selector does not have the indication that the WTRU should switch to SNPN access mode, it may further check if the network identifiers in the prioritized list are SNPN networks or PLMN networks, and may switch to SNPN access mode for those SNPN networks.

If the CAG ID broadcasted by the PALS network cell is configured in the WTRU's allowed CAG list. The WTRU will check the broadcasted CAG ID against the configured allowed CAG ID list corresponding to the PALS network.

If the WTRU has determined to use the PALS Network Selector for network selection, it may search networks and select the network according to the priority order in the list. If the WTRU has switched to SNPN access mode, it may only search and select SNPN networks (323). If the WTRU is not in SNPN access mode, it may only search and select PLMN networks (325).

The WTRU checks if any found network(s) is/are in in the selector's list (327). If not, the process ends. For each network identifier that is in the list, the WTRU determines if the network has an associated time window and/or area (329). If there are no such criteria, the WTRU selects the network (333) If there are such criteria, the WTRU checks if the current time and/or WTRU location meets the condition (331), and if the criteria are met, it selects the network (333) and the selection process is complete. If not, the process is ended without selecting a PALS network.

In an alternate embodiment, the WTRU may present the found network that meets the above conditions to the user and allow the user to decide whether to select the network.

In embodiments, if there is a Time Window and/or an Area associated with an active PALS Network Selector, or if there is a Time Window and/or an Area associated with the selected PALS network, the WTRU should keep monitoring the time and the WTRU's location to determine whether to deactivate the selector or re-select the network. If the time is out of the Time Window associated with the PALS Network Selector or the WTRU location is out of the area associated with the selector, the WTRU should deactivate the PALS Network Selector and use a PLMN selector to reselect a PLMN network.

If the time is out of the Time Window associated with the selected PALS network or the WTRU location is out of the area associated with the selected network, the WTRU should de-register from the PALS network and re-select another PALS network or PLMN network.

If the selected PALS network becomes unavailable, e.g., due to WTRU moving out of its coverage, the WTRU may reselect another PALS network that is in the list or the WTRU may de-activate the PALS Network Selector and use the PLMN network selectors to re-select a PLMN network.

The 5GS network may, at any time, update the SoR for PALS network steering (e.g., during the periodic or mobility registration procedure) or via the UCU procedure. The WTRU should replace the stored PALS Network Selector(s) with the new one(s) and re-select the network according to the new PALS Network Selector if they meet the conditions to be activated.

The WTRU may receive the initial time window in the Registration Accept message when it registers to the PALS network. The WTRU may trigger the Registration procedure to request a new time window from the network.

The time window also may be on the PDU session level. The network may configure the time window for each PDU session established with the PALS network. The WTRU in this case may receive the time window from the network (SMF) in the PDU session accept message. When the time window expires, the WTRU may deactivate the PDU session. The WTRU may implicitly deactivate the PDU session or may send the PDU session deactivation message to the network.

The network may want to extend the time window. In such a case, the network may respond to PDU session deactivation message with a PDU deactivation reject message with the cause code and a new time window for the WTRU. The time window also may be updated by the WTRU (in the case the WTRU receives indication from the higher layers). The WTRU may send an indication or request a new time window from the network by sending a session management NAS message to the network, e.g., a PDU session modification request.

The network (e.g. AMF or SMF) may determine the time window or decide to update the time window based on interactions with a third party external server (the PALS network may be configured by a third party server). The external server may interact with the PALS network via the NEF API. The NEF (Network Exposure Function) API will provide the ability to the third party server to provide inputs to the network to determine the time window for the PALs network either for the registration procedure or session management procedure or both. The inputs provided by the third party server to the network may include expected time of the event that the PALs network is created for, indication of the start of the event, indication of when the event is close to being ended, etc.

The 5GS network may, at any time, revoke the SoR for PALS network steering, in which case the WTRU should delete the stored PALS Network Selector(s) and re-select a network according to other PLMN network selectors.

Network Steering between Multiple PALS Networks

As the local services can be temporary, event-based, and confined to a specific environment, the hosting network that offers the local services can be a PLMN or SNPN (Standalone Non-Public Network). In some venues, such as a festival venue, stadium, or convention center, there can be multiple hosting network deployments to cover the same area and offer either different or the same/similar services. For example, a venue owner may deploy the network infrastructure and lease the infrastructure to several PLMN or SNPN operators in order for them to provide temporary, event-related services to spectators/audiences/attendees. As the services as well as the hosting network may be temporary, it can be expected that a PLMN operator will not have long-term, individual service level agreements (SLAs) with each hosting network. Therefore, it can be expected that these short-term agreements are event-based and may have different charging policies depending on the infrastructure capabilities or agreements between the hosting networks and the infrastructure owner.

Theoretically, users who wish to access the local services can choose which hosting network to access manually. However, there may be some coverage and charging implications that need to be optimized from both the user and PLMN operator sides. On the one hand, the same or a similar service can be offered by two different hosting networks, and a PLMN may have a preference for its subscribers to choose the hosting network with the better agreement. On the other hand, based on the battery level of the WTRU, a user may want to choose the hosting network that provides better signal strength/quality, even if that hosting network has an inferior agreement compared to another network option. Therefore, a mechanism is needed to incorporate WTRU-preference and/or network preference when a WTRU requests either an initial access to a local service or switches from one local service to another.

Thus, an issue that is ripe for consideration is how to enable WTRU and PLMN operators to prioritize hosting networks that are offering the same or similar local services within the same venue/confined environment/coverage area.

This section describes techniques for steering WTRU's between multiple PALS networks that enable the SoR-AF to construct a preferred PALS network list using the service information retrieved from the PALS networks (e.g., QoS/KPI (Quality of Service/Key Performance Indicator) and charging data). The WTRU may also select its own preferred PALS network based on received signal level. This section also describes an algorithm to choose between a WTRU-constructed list and network-provided list when both are available to a WTRU.

These techniques include algorithms and procedures to prioritize hosting networks that are offering the same or similar local service. Prioritization of the hosting networks can be based on:
  (i) PLMN operator preference, which may account for parameters such as the hosting network load, service specific QoS/KPI provisioning, and service charging information according to the SLA terms with the hosting network; and
  (ii) WTRU preference, which may account for parameters such as the received signal strength of hosting networks providing the requested local service, the WTRU battery level, etc.

Local services provided by the hosting networks may be conventional services such as voice and data, as well as new services, such as computing, machine learning (ML), and storage. Therefore, it can be expected that there may be various QoS/KPI assignments for different service types. For example, QoS/KPI of a ML-oriented service may be a confidence level of the ML model inference. On the other hand, the performance of a computing-oriented service may be dependent on the available computer resources and load level of the hosting network. As at least one goal is to account for different components of a local service and hosting network, different utility functions may be considered to assess the value/performance of various information elements within a range, e.g., from 0 to 1. These different utility functions as well as their weights on the network priority assessment can be configured to represent a network operator's preferences or objectives.

Figure 4:
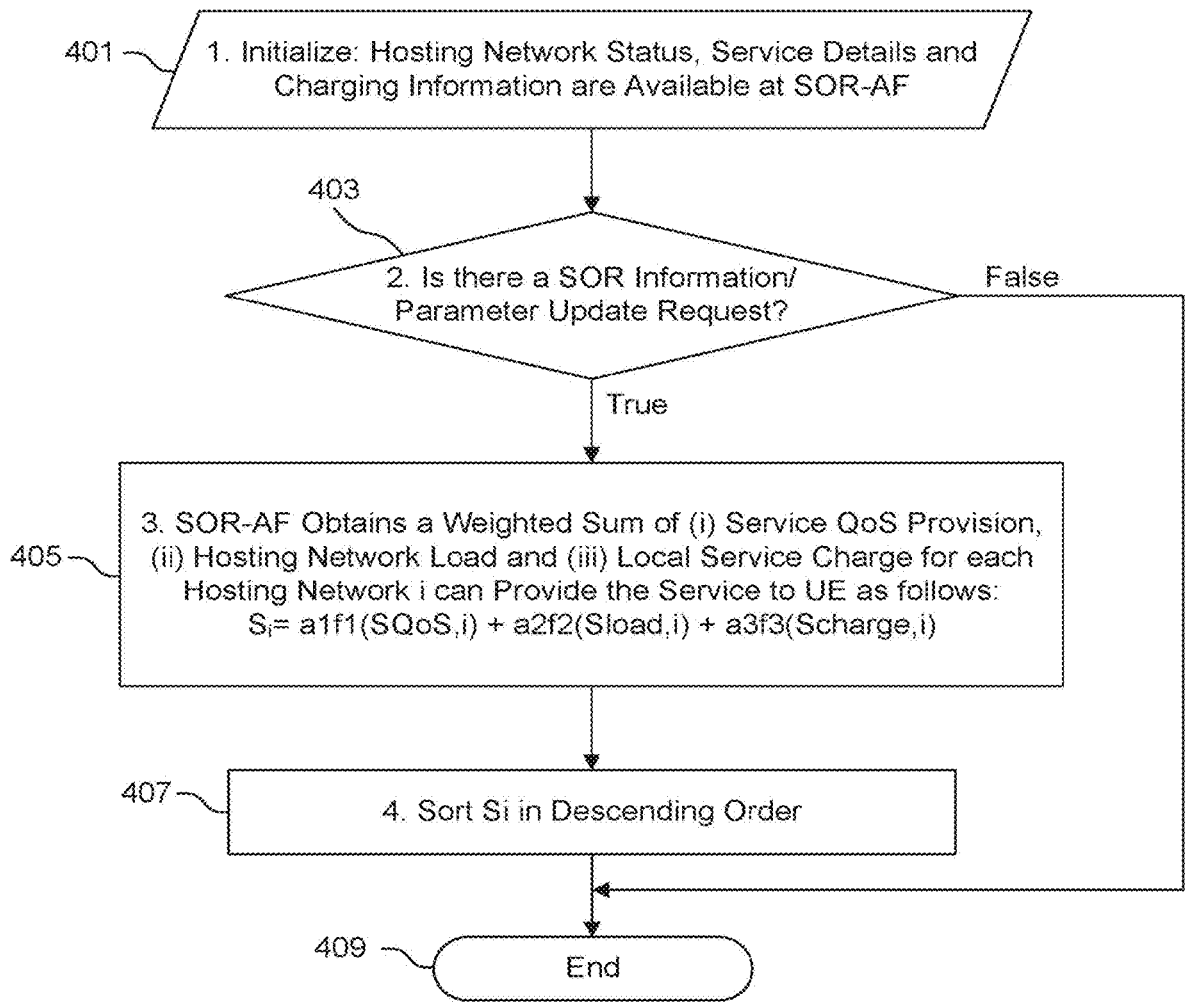
FIG. 4 is a flowchart illustrating an exemplary method for steering of Roaming Application Function (SoR-AF) to construct a network-preferred hosting network prioritization list in accordance with an embodiment.

FIG. 4 illustrates an exemplary embodiment of a method for the Steering of Roaming Application Function (SoR-AF) to construct a network-preferred hosting network prioritization list.

The algorithm is initialized when (i) the status information of each hosting network (such as network load); (ii) service details (such as service-specific QoS provision from each hosting network); and (iii) service charging information from each hosting network are available at SOR-AF (401).

Next, a control mechanism checks whether a SOR information/parameter update request has been received (403).

If there is a SOR information/parameter update request, SOR-AF uses the hosting network and local service related information, namely, service QoS provision (SQoS,i), hosting network load (Sload,i) and service charge information (Scharge,i) for the hosting network i. Each information element is used as the input of the relevant utility functions f1 for service QoS provision, f2 for hosting network load, and f3 for service charging. If the WTRU has provided a list of available hosting networks (see FIG. 6, for instance) that shall be prioritized, then SOR-AF may take into consideration radio parameters (e.g., signal strength per hosting network), UE battery level, and/or battery threshold level as an additional functional input to the algorithm if such additional parameters were optionally provided by the WTRU. The outputs of the utility functions are summed, and a priority level of each hosting network Si is obtained (405).

Upon determining the priority levels of the hosting networks, SOR-AF sorts the priority level in descending order (407)—the hosting network with the highest priority becomes the first item in the list. The process ends at 409.

For a WTRU to construct a network priority list, first of all, a network scanning process is triggered to obtain the received signal level of the available hosting networks. Once the received signal strength information is available at the WTRU, the WTRU constructs its own priority list of available hosting networks by sorting all the networks in descending order based on their received signal level. Accordingly, the hosting network with the highest received signal level becomes the first item in the list.

As a WTRU will have one priority list based on its preference and another priority list messaged from its home PLMN that is based on the network preference, a method has been developed to decide which lists will be considered for use and, of those lists, which list to use. As WTRU constructs its priority list based on the received signal level of the surrounding hosting networks, the hosting network with the highest priority may be considered as the network that would be the most energy efficient. Therefore, in one embodiment, a user-defined battery level threshold may be used to determine whether the WTRU will use the WTRU-preferred priority list or the network-preferred priority list to select a network. Such a threshold value can be configured by the WTRU. However, if the network would like to force its priority list to be considered by the WTRU during the network selection process, the battery level threshold value can be set to 0.

Figure 5:
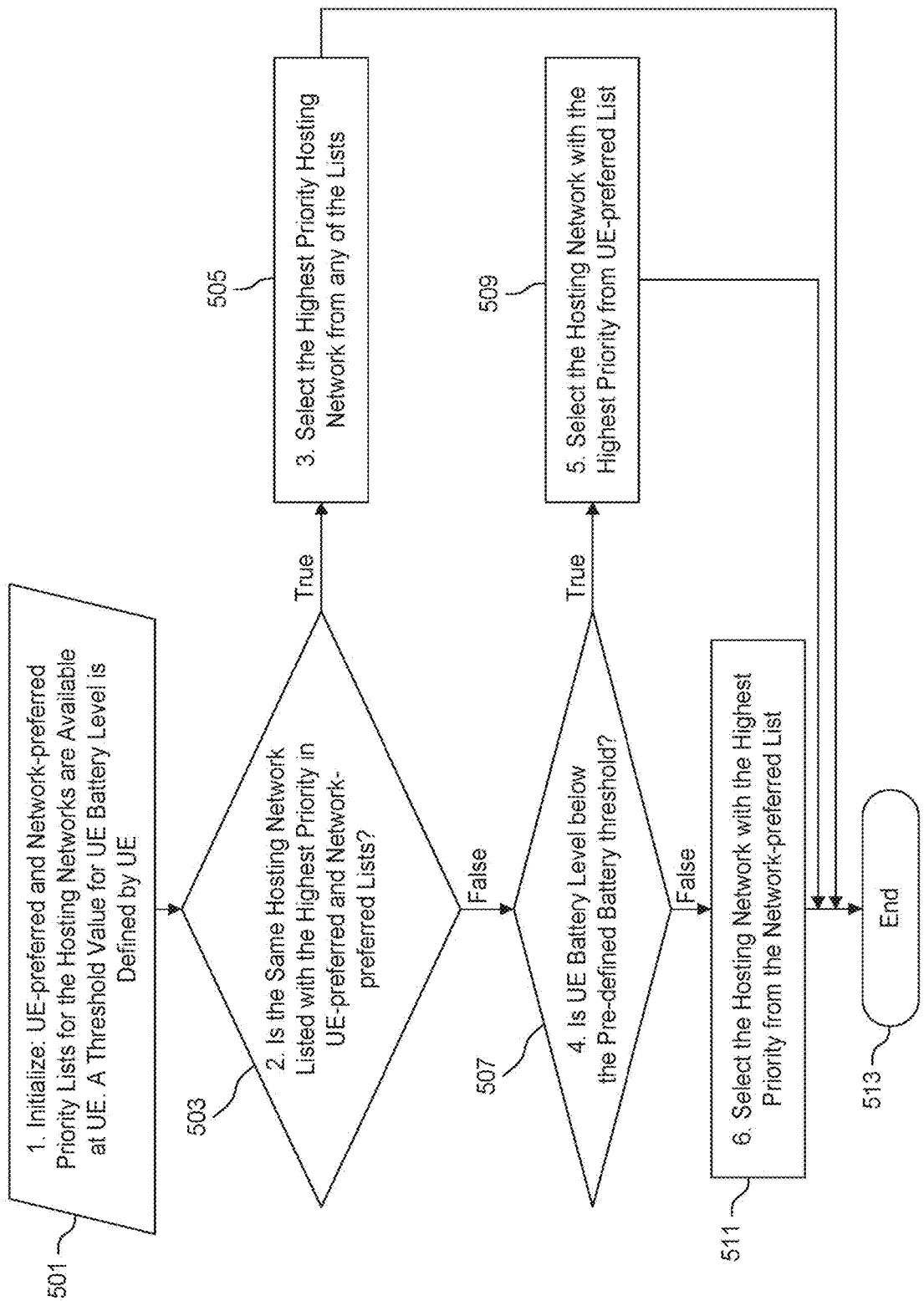
FIG. 5 is a flowchart illustrating an exemplary method for a WTRU to select a hosting network from WTRU-preferred or network-preferred hosting networks lists in accordance with an embodiment.

FIG. 5 is a flowchart illustrating a network selection process in accordance with such an embodiment. The method is initialized at 501 when (i) the WTRU battery level threshold value; (ii) WTRU-preferred; and (iii) network-preferred priority lists are available at the WTRU.

At step 502, a control mechanism checks whether the first items in both the WTRU-preferred and the network-preferred priority lists belong to the same hosting network.

If the same hosting network is listed as the highest priority network in both WTRU-preferred and network-preferred priority lists, flow proceeds to step 505 where the WTRU selects this hosting network.

If, on the other hand, in step 503, it is determined that different hosting networks are listed as the highest priority network in the WTRU-preferred and the network-preferred lists, flow proceeds to step 507, in which another control mechanism checks whether WTRU battery level is below the pre-defined battery level threshold value.

If the WTRU battery level is below the threshold, flow proceeds to step 509, in which the hosting network with the highest priority in the WTRU-preferred priority list is selected.

If the WTRU battery level is above the threshold, flow instead proceeds to step 511, in which the hosting network with the highest priority in the network-preferred priority list is selected. The process ends at 513.

Figure 6:
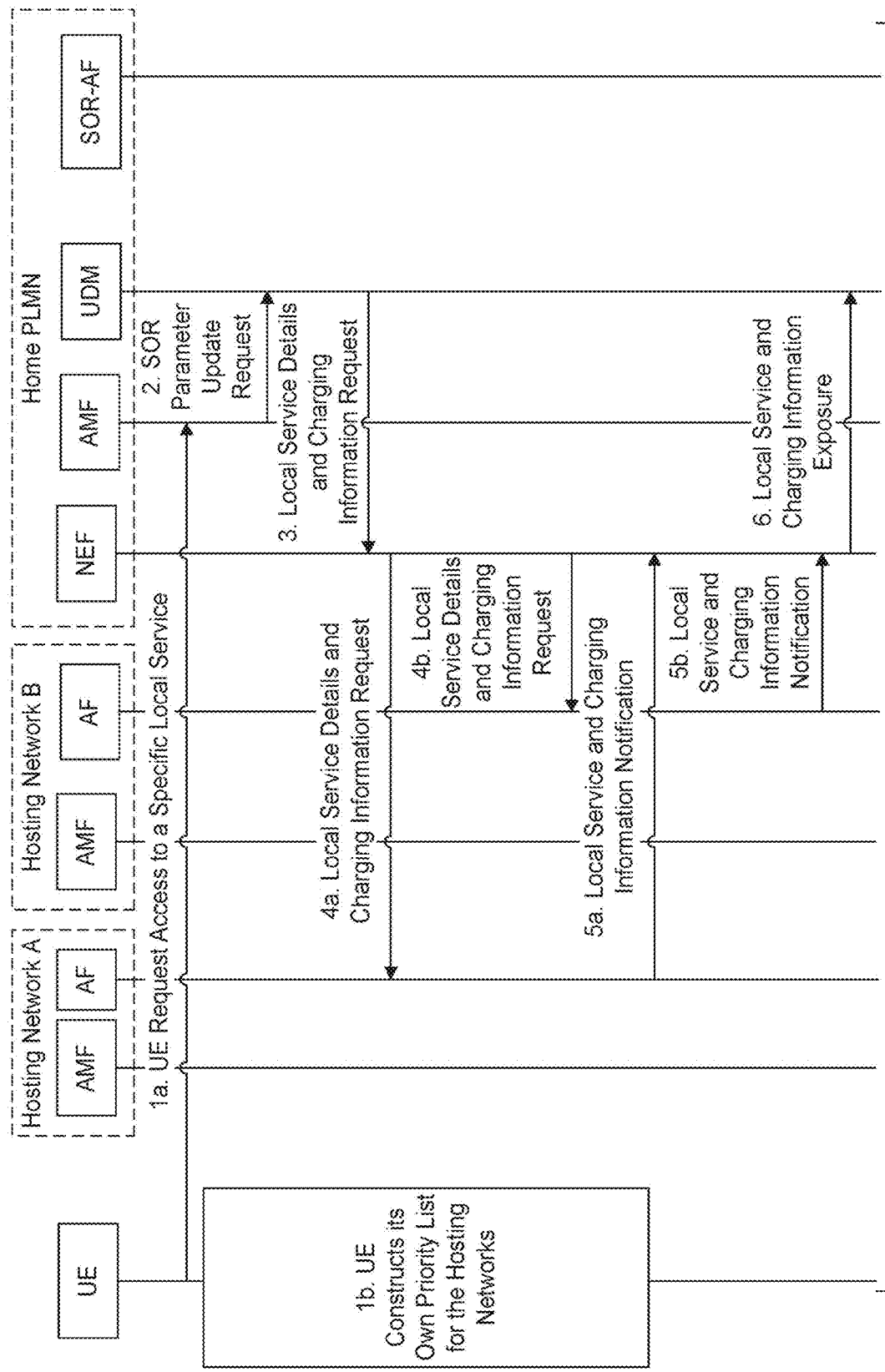
FIG. 6 is a signal flow diagram for a hosting network prioritization and selection procedure in accordance with an embodiment.
Figure 6:
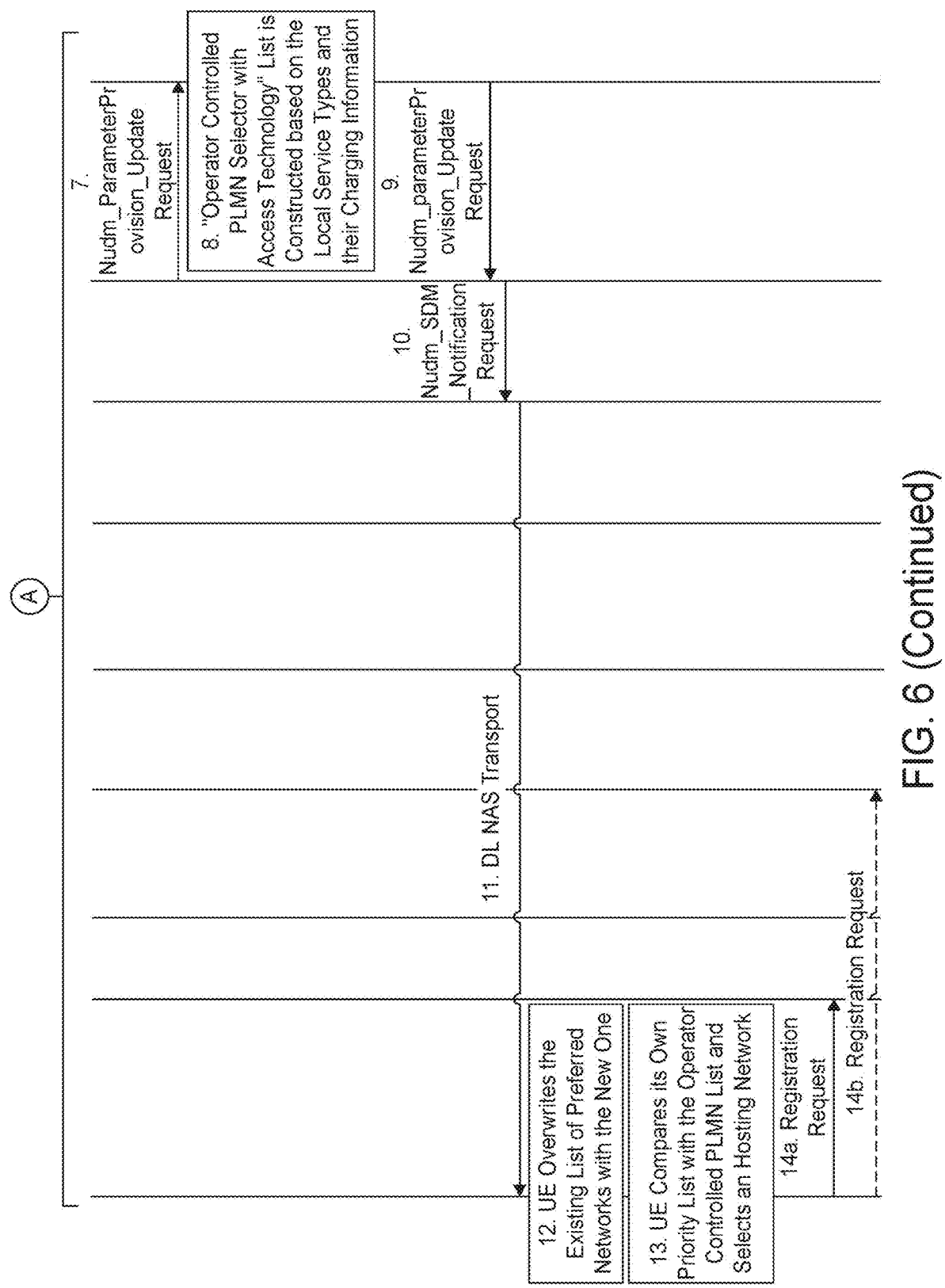

FIG. 6 is a signal flow diagram illustrating an exemplary signal flow for the hosting network prioritization and selection procedure in accordance with an embodiment.

In step 1a, the WTRU sends an access request to its home PLMN regarding a specific local service, which may be a conventional service (voice, data) or a new service, e.g., computing services, ML services, storage services.

Once the WTRU sends the access request, in step 1b, it triggers a network scanning process in order to determine the received signal level of the available hosting networks and then constructs its own priority list of available hosting networks by sorting all the networks in descending order based on their received signal level.

In step 2, the AMF sends a SOR information/parameter update request to the UDM.

In step 3, the UDM requests the details and charging information of the requested service from the NEF.

In step 4, the NEF requests the service details and charging information from the hosting networks that have coverage in the WTRU's location and are providing the requested service. In this example, there are two such networks, namely, Hosting Network A and Hosting Network B; so there are two such requests, 4a and 4b.

In steps 5a and 5b, Hosting Network A and Hosting Network B send the local service details and charging information to the home PLMN, respectively.

In step 6, the local service and charging information received from the hosting networks are exposed to the UDM in the Home PLMN.

In step 7, the UDM sends a SOR parameter update request to the home PLMN SOR-AF.

In step 8, based on the received local service and charging information, the home PLMN SOR-AF constructs a priority list for the hosting networks providing the local service, such as described in connection with FIG. 4.

In step 9, the SOR-AF sends the priority list for the hosting networks back to the UDM as a SOR parameter update response.

In step 10, the UDM sends an update request to the AMF regarding the SOR information/parameters to the WTRU.

In step 11, the AMF transmits the updated SOR parameter to the WTRU via a DL NAS (Downlink Non-Access Stratum) message.

In step 12, upon receiving the updated SOR information/parameter on the network priority list, the WTRU overwrites the existing list with the new one.

In step 13, the WTRU compares the network-preferred priority list and its own priority list in order to select one of the hosting networks to access the local service, such as described in connection with FIG. 5.

In step 14, the WTRU attempts a registration to the selected hosting network, wherein step 14a represents the signal flow if Hosting Network A is selected and step 14b represents the signal flow if Hosting Network B is selected.

The methods, apparatus, techniques, and procedure described in this disclosure also may apply in cases where WTRU switches from one local service to another. In each time, the described message flow can be followed to incorporate WTRU preference as well as its home PLMN preference for the hosting network selection.

Alternatively, a WTRU may be configured to prioritize the list of available hosting networks i.e., hosting networks that are detected as a result of radio scan, in accordance with any of the following methods.

In a first alternative, the WTRU may share the list of available hosting networks along with optional parameters (e.g., radio signal strength per hosting network, battery information of the WTRU, and threshold configuration for battery level) with the network and permit the network to assist with the prioritization. Whether to operate in this manner may be based on whether the WTRU is configured to use the network assistance to prioritize the available hosting networks and/or the network has indicated support for network assisted prioritization during registration/mobility registration procedure. The network may prioritize the list received from the WTRU using any of the methods discussed above (e.g., see FIG. 4) and send it back to the WTRU via control plane NAS signaling.

In another alternative embodiment, the WTRU may prioritize the list of available hosting networks by sorting it based on a network-provided preferred priority list of hosting networks. The WTRU may be configured (e.g., pre-configured and/or configured via control signaling from the network during operation) whether to operate in accordance with this embodiment. In addition, the specific implementation details/configurations for this embodiment may be configured in the WTRU (e.g., pre-configured and/or via control signaling form the network). The WTRU would check if available hosting networks were present in the network-preferred priority list, and, if so, priority may be set according to that network-preferred list.

Figure 7:
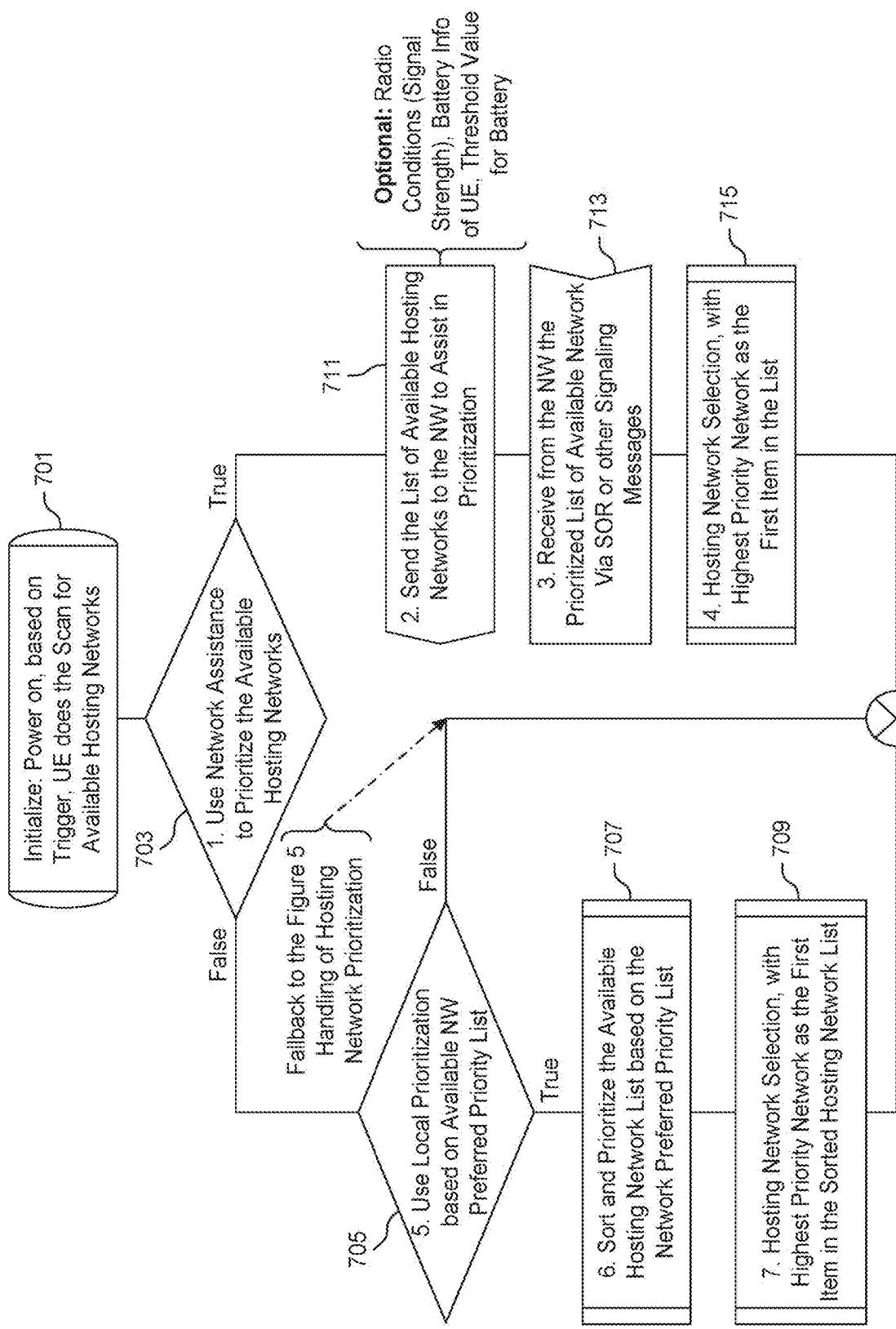
FIG. 7 is a flowchart illustrating an alternative process for a WTRU to prioritize a list of available hosting networks in accordance with an embodiment.

FIG. 7 is a flowchart illustrating a process in accordance with this alternative type of embodiment. In step 701, the WTRU scans for available hosting networks. This scan may be performed when the WTRU powers up and/or based on a trigger event, such as a user input. As noted above, this may be configured (e.g., pre-configured) in the WTRU and/or based on a trigger event, such as an indication from the network during registration/mobility registration procedure that it supports network assisted prioritization.

In step 703, the WTRU checks if it is configured to use network assistance to prioritize available hosting networks.

If the WTRU is configured to use network assistance to prioritize hosting networks, network-assisted prioritization is selected in step 703, and flow proceeds from step 703 to step 711, where the WTRU sends the list of available hosting networks developed in step 702 to the Home PLMN, such as via control plane NAS signaling (e.g., Mobility registration update, service request messages). Optionally, the WTRU may include additional information along with the list of found hosting networks, e.g., Signal Strength per hosting network, battery information of the WTRU, threshold for battery level when it shall be considered for prioritizing the hosting networks (i.e., if the battery level of the WTRU is below a threshold value, the network should prioritize those hosting networks that have good radio conditions and require less WTRU power for communication).

The network may prioritize the list of hosting networks received from the WTRU using the mechanism/algorithm defined in FIG. 4, for instance, and send the prioritized list back to the WTRU. The network may send the list of prioritized hosting networks to the WTRU via SoR or control plane NAS signaling (WTRU configuration Update command procedure).

Thus, next, in step 713, the WTRU receives the prioritized list from the network and, in step 715, selects the hosting network from the available hosting networks having the highest priority in the received list.

If, on the other hand, the WTRU is not configured to use network-assisted prioritization, flow instead proceeds to step 705, where the WTRU checks if it is configured with local prioritization based on a network-preferred priority list. If not, it will fall back to another prioritization scheme, such as the scheme illustrated in FIG. 5. If so, flow instead proceeds to step 707, where the WTRU sorts the list of available hosting networks (found during the radio scan in step 701) based on the network-preferred priority list. Any available hosting network that also is present in the network preferred priority list will get the same priority in the final sorted hosting network list. Then, in step 709, the WTRU uses the sorted hosting network list prepared in step 707 to trigger hosting network selection, the first entry in the list being the highest priority.

Figure 8:
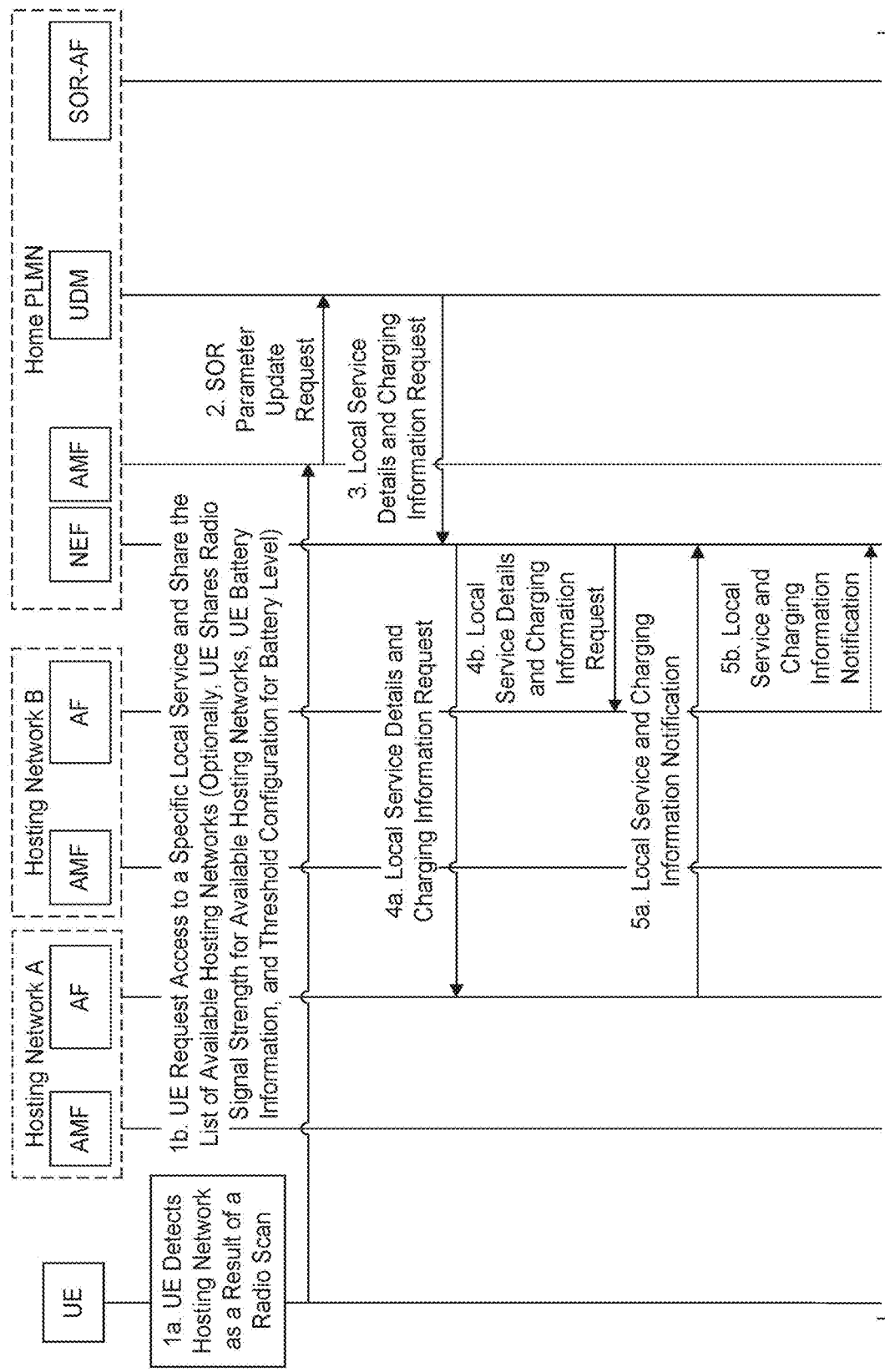
FIG. 8 is a signal flow diagram illustrating the alternative process exemplified by the flowchart of FIG. 7 for hosting network prioritization and selection procedure in accordance with an embodiment.
Figure 8:
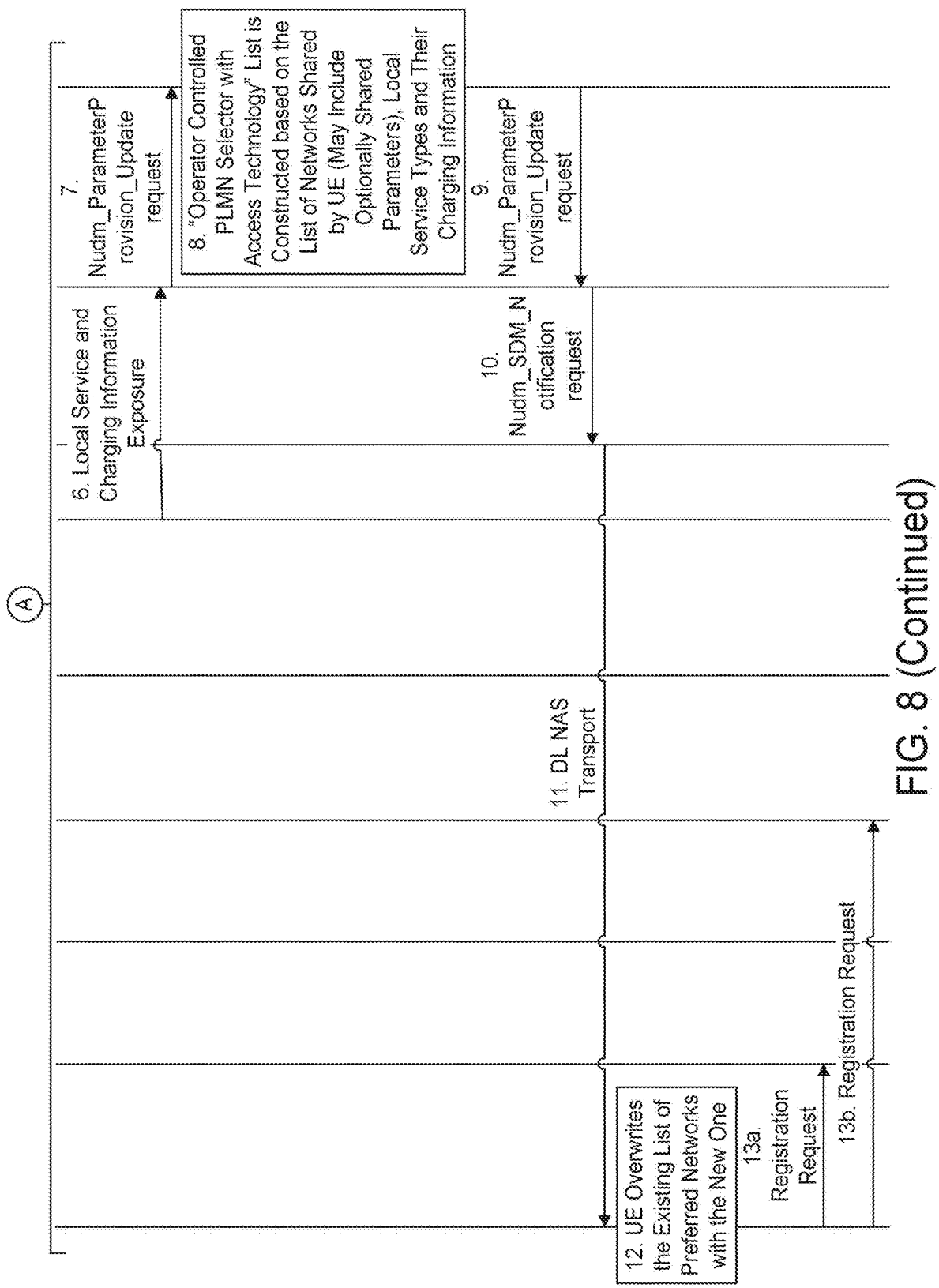

FIG. 8 is a signal flow diagram illustrating exemplary signal flow in accordance with this alternative hosting network prioritization and selection procedure.

In step 1a, the WTRU performs a radio scan and detects available hosting networks. In step 1b, the WTRU (i) sends an access request to its home PLMN regarding a specific local service, which may be a conventional service (voice, data) or a new service, e.g., computing services, ML services, storage services; and (ii) shares the list of available hosting networks, optionally along with a radio signal strength of each available hosting network detected during the radio scan, WTRU battery level information, and threshold configuration for WTRU battery level.

In step 2, the AMF sends a SOR information/parameter update request to the UDM.

In step 3, the UDM requests the details and charging information of the requested service from the NEF.

In response, the NEF requests the service details and charging information from the hosting networks that have coverage on the WTRU location and are providing the requested service. In this example, the WTRU is in the coverage area of Hosting Network A and Hosting Network B. Thus, in step 4a, the NEF sends the request to Hosting Network A, and in step 4b, the NEF sends the request to the Hosting Network B.

Next, in steps 5a and 5b, Hosting Network A and Hosting Network B send the local service details and charging information to the home PLMN, respectively.

Then, in step 6, the local service and charging information received from the hosting networks are exposed to the UDM.

The UDM, in step 7, sends a SOR parameter update request to the home PLMN SOR-AF.

In step 8, based on the list of available hosting networks shared by the WTRU (which may include the optionally shared parameters noted in step 1b) and the received local service and charging information, the home PLMN SOR-AF constructs a priority list for the hosting networks providing the local service, as described in FIG. 4.

In step 9, the SoR-AF sends the priority list for the hosting networks back to UDM as a SOR parameter update response.

In step 10, the UDM sends an update request to AMF regarding the SOR information/parameters to the WTRU.

In step 11, the AMF transmits the updated SOR parameter to the WTRU via DL NAS message.

Upon receiving the updated SOR information/parameter on the network priority list, in step 12, the WTRU overwrites the existing list with the new one.

Next, in step 13a or 13b, the WTRU attempts a registration to the selected hosting network, where step 13a considers the selected hosting network to be Hosting Network A and step 13b considers the selected hosting network to be Hosting Network B.

Figure 9:
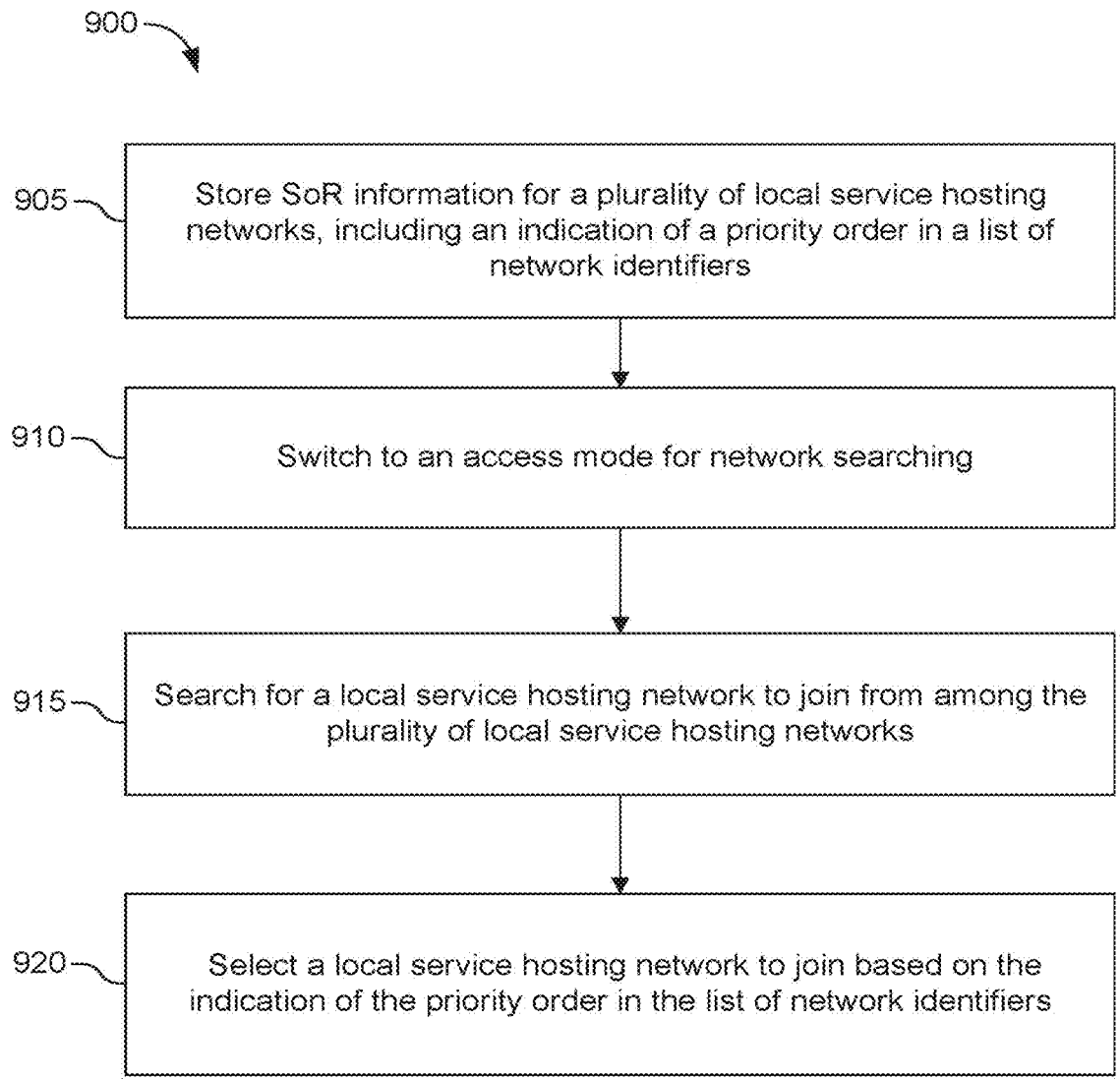
FIG. 9 is a flowchart illustrating a method to select a local network for a WTRU to join.

Based on the forgoing discussion of network steering between multiple wireless networks, FIG. 9 depicts an example method 900 for selecting a local network for a WTRU to join. In one example, the WTRU may be operating in a PLMN and may be tasked with selecting a local service hosting network, such as in a PALS network, with which to join.

At 905, the WTRU stores SoR information for a plurality of local service hosting networks. The SoR information includes an indication of a priority order in a list of network identifiers. In one example, the network identifiers may include PLMN identifiers or SNPN network identifiers. At 910, the WTRU may switch to an access mode for network searching. In one example, switching to an access mode for network searching may include switching to a SNPN, access mode to enable searching of networks listed in the prioritized list of network identifiers.

At 915, the WTRU may search for a local service hosting network to join from among the plurality of local service hosting networks. This search may allow the WTRU to determine which network(s) in the list of network identifiers is available for joining. In one example, the search may include a search of SNPNs to join from among the plurality of local service hosting networks in the list of network identifiers. At 920, the WTRU selects a local service hosting network to join based on the indication of the priority order in the list of network identifiers. In one example, the WTRU may select a SNPN based on at least the priority of the SNPN on the list of network identifiers. In a further example, selecting the local service hosting network to join may include selecting a local hosting network having a network identifier associated with either or both of a time window and/or a geographic area. The time window indicates a time period during which the corresponding network is considered valid or available for joining. The geographic area indicates an area within which the local service is available. In one embodiment, the selection by a WTRU of a local service hosting network may be performed by a network selector as described hereinabove.

The method 900 may further include a procedure to update the SoR information during any one or more of a periodic procedure or a mobility registration procedure. Such an update may include adding to the existing SoR information or replacing the SoR information when new information becomes available. Such an update may be based on a location update of a WTRU and/or an update of a local service hosting network information such as a change of identity, capability, or availability for WTRU use.

CONCLUSION

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

The foregoing embodiments are discussed, for simplicity, with regard to the terminology and structure of infrared capable devices, i.e., infrared emitters and receivers. However, the embodiments discussed are not limited to these systems but may be applied to other systems that use other forms of electromagnetic waves or non-electromagnetic waves such as acoustic waves.

It is also to be understood that the terminology used herein is for the purpose of describing particular embodiments only, and is not intended to be limiting. As used herein, the term "video" or the term "imagery" may mean any of a snapshot, single image and/or multiple images displayed over a time basis. As another example, when referred to herein, the terms "user equipment" and its abbreviation "UE", the term "remote" and/or the terms "head mounted display" or its abbreviation "HMD" may mean or include (i) a wireless transmit and/or receive unit (WTRU); (ii) any of a number of embodiments of a WTRU; (iii) a wireless-capable and/or wired-capable (e.g., tetherable) device configured with, inter alia, some or all structures and functionality of a WTRU; (iii) a wireless-capable and/or wired-capable device configured with less than all structures and functionality of a WTRU; or (iv) the like. Details of an example WTRU, which may be representative of any WTRU recited herein, are provided herein with respect to FIGS. 1A-1D. As another example, various disclosed embodiments herein supra and infra are described as utilizing a head mounted display. Those skilled in the art will recognize that a device other than the head mounted display may be utilized and some or all of the disclosure and various disclosed embodiments can be modified accordingly without undue experimentation.

Examples of such other device may include a drone or other device configured to stream information for providing the adapted reality experience.

In addition, the methods provided herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, MME, EPC, AMF or any host computer.

Variations of the method, apparatus and system provided above are possible without departing from the scope of the invention. In view of the wide variety of embodiments that can be applied, it should be understood that the illustrated embodiments are examples only, and should not be taken as limiting the scope of the following claims. For instance, the embodiments provided herein include handheld devices, which may include or be utilized with any appropriate voltage source, such as a battery and the like, providing any appropriate voltage.

Moreover, in the embodiments provided above, processing platforms, computing systems, controllers, and other devices that include processors are noted. These devices may include at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory (RAM)) or non-volatile (e.g., Read-Only Memory (ROM)) mass storage system readable by the CPU. The computer readable medium may include cooperating or interconnected computer readable medium, which exist exclusively on the processing system or are distributed among multiple interconnected processing systems that may be local or remote to the processing system. It should be understood that the embodiments are not limited to the above-mentioned memories and that other platforms and memories may support the provided methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost versus efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples include one or more functions and/or operations, it will be understood by those within the art that each function and/or operation within such block diagrams, flowcharts, or examples may be implemented, individually and/or collectively, by a wide range of hardware, software, firmware, or virtually any combination thereof. In an embodiment, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system may generally include one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity, control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components included within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may include usage of the introductory phrases "at least one" and "one or more" to introduce claim recitations. However, the use of such phrases should not be construed to imply that the introduction of a claim recitation by the indefinite articles "a" or "an" limits any particular claim including such introduced claim recitation to embodiments including only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" is intended to include any number of items, including zero. Additionally, as used herein, the term "number" is intended to include any number, including zero. And the term "multiple", as used herein, is intended to be synonymous with "a plurality".

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

What is claimed is:

1. A wireless transmit/receive unit (WTRU) comprising circuitry configured to:
   receive, via non-access stratum signaling, steering of roaming (SoR) information for one or more networks providing localized services, wherein the SoR information comprises an indication of a prioritized list of one or more networks providing localized services, wherein each network providing localized services in the prioritized list of one or more networks is associated with a network identifier, a time period, and a geographic area;
   select a network providing localized services based on the prioritized list of one or more networks providing localized services, on a condition that a current time is within the time period associated with the selected network providing localized services;
   search for the selected network providing localized services; and
   on a condition that the selected network providing localized services is found, register with the selected network providing localized services.

2. The WTRU of claim 1, wherein the WTRU circuitry is further configured to connect to the selected network providing localized services.

3. The WTRU of claim 1, wherein the WTRU circuitry is further configured to search for a local service network providing localized services after switching from a Public Land Mobile Network operating mode to a Stand Alone Non-Public Network (SNPN) access mode.

4. The WTRU of claim 1, wherein the SoR information is provided by a Public Land Mobile Network.

5. The WTRU of claim 1, wherein the prioritized list of one or more networks providing localized services includes a plurality of networks providing localized services.

6. The WTRU of claim 1, wherein the WTRU is further configured to update the SoR information during any one or more of a periodic procedure or a mobility registration procedure.

7. The WTRU of claim 1, wherein each network in the prioritized list of one or more networks providing localized services is associated with a geographic area corresponding to an area within which the network is available.

8. The WTRU of claim 1, wherein the WTRU is further configured to select a network providing localized services with which to connect using a network selector function of the WTRU circuitry.

9. The WTRU of claim 1, wherein the selected network providing localized services is associated with a geographic area that comprises a current location of the WTRU.

10. A method performed by a wireless transmit/receive unit (WTRU) to select a network providing localized services, the method comprising:
    receiving, via non-access stratum signaling, steering of roaming (SoR) information for one or more local service networks providing localized services, wherein the SoR information comprises an indication of a prioritized list of one or more networks providing localized services, wherein each network providing localized services in the prioritized list of one or more networks is associated with a network identifier, a time period, and a geographic area;
    selecting a network providing localized services based on the prioritized list of one or more networks providing localized services, on a condition that a current time is within the time period associated with the selected network providing localized services;

searching for the selected network providing localized services; and on a condition that the selected network providing localized services is found, registering with the selected network providing localized services.

11. The method of claim 10, further comprising connecting to the selected network providing localized services.

12. The method of claim 10, wherein searching for a network providing localized services with which to connect is performed after switching from a Public Land Mobile Network operating mode to a Stand Alone Non-Public Network (SNPN) access mode.

13. The method of claim 10, wherein the SoR information is provided by a Public Land Mobile Network.

14. The method of claim 10, wherein the prioritized list of one or more networks providing localized services includes a plurality of networks providing localized services.

15. The method of claim 10, wherein the method further comprises updating the SoR information during any one or more of a periodic procedure or a mobility registration procedure.

16. The method of claim 10, wherein each network in the prioritized list of one or more networks providing localized services is associated with a geographic area corresponding to an area within which the network is available.

17. The method of claim 10, wherein selecting a network providing localized services with which to connect comprises using a network selector function of the WTRU.

18. The method of claim 10, the selected network providing localized services is associated with a geographic area that comprises a current location of the WTRU.

19. A non-transitory computer-readable medium having instructions stored thereon, which, when executed by a processor, perform a method for a wireless transmit/receive unit (WTRU) to select a network providing localized services, the method comprising:

receiving, via non-access stratum signaling, steering of roaming (SoR) information for one or more local service networks providing localized services, wherein the SoR information comprises an indication of a prioritized list of one or more networks providing localized services, wherein each network providing localized services in the prioritized list of one or more networks is associated with a network identifier, a time period, and a geographic area;

selecting a network providing localized services based on the prioritized list of one or more networks providing localized services, on a condition that a current time is within the time period associated with the selected network providing localized services;

searching for the selected network providing localized services; and on a condition that the selected network providing localized services is found, registering with the selected network providing localized services.

20. The non-transitory computer-readable medium of claim 19, wherein the selected network providing localized services is associated with a geographic area that comprises a current location of the WTRU.

* * * * *